(12) United States Patent
Parikh et al.

(10) Patent No.: US 10,412,076 B2
(45) Date of Patent: Sep. 10, 2019

(54) IDENTIFYING USERS BASED ON FEDERATED USER IDENTIFIERS

(71) Applicant: Facebook, Inc., Menlo Park, CA (US)

(72) Inventors: Mehul S. Parikh, Fremont, CA (US); Marc Christian Saba, Palo Alto, CA (US); Li Zhou, Campbell, CA (US); Yimin Song, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 277 days.

(21) Appl. No.: 15/282,666

(22) Filed: Sep. 30, 2016

(65) Prior Publication Data

US 2018/0097800 A1    Apr. 5, 2018

(51) Int. Cl.
*H04L 29/06* (2006.01)

(52) U.S. Cl.
CPC ............................. *H04L 63/0815* (2013.01)

(58) Field of Classification Search
CPC .................................................. H04L 63/0815
See application file for complete search history.

(56) References Cited

U.S. PATENT DOCUMENTS

| | | | | |
|---|---|---|---|---|
| 9,807,194 B1* | 10/2017 | Beaty | ..................... | H04L 67/306 |
| 2012/0110071 A1* | 5/2012 | Zhou | ....................... | G06Q 10/10 709/204 |
| 2014/0068736 A1* | 3/2014 | Agerstam | ............. | H04W 12/06 726/7 |
| 2014/0229273 A1 | 8/2014 | Garcia-Martinez et al. | | |
| 2014/0279045 A1 | 9/2014 | Shottan | | |
| 2014/0358826 A1 | 12/2014 | Traupman et al. | | |
| 2015/0019547 A1* | 1/2015 | Thalapathy | ....... | G06F 17/30699 707/732 |
| 2015/0156192 A1* | 6/2015 | Yang | ................... | H04L 63/0815 726/6 |
| 2015/0293997 A1 | 10/2015 | Smith et al. | | |
| 2015/0371256 A1* | 12/2015 | Shah | .................. | G06Q 30/0242 705/14.41 |
| 2016/0080793 A1* | 3/2016 | Ruffini | ............... | H04N 21/2668 725/34 |
| 2016/0259790 A1 | 9/2016 | Mashiach et al. | | |
| 2017/0026703 A1 | 1/2017 | Phadnis | | |
| 2017/0103322 A1 | 4/2017 | Baluja et al. | | |
| 2018/0040003 A1 | 2/2018 | Scharf | | |
| 2018/0046628 A1 | 2/2018 | Wang et al. | | |
| 2018/0052913 A1* | 2/2018 | Gaskill | .................... | G06N 5/02 |

* cited by examiner

*Primary Examiner* — Farid Homayounmehr
*Assistant Examiner* — Suman Debnath
(74) *Attorney, Agent, or Firm* — Fenwick & West LLP (57) ABSTRACT

An online system receives a variety of identifiers associated with a user of the online system and generates a federated list of identifiers for the user that includes each of the received identifiers. Identifiers may be browser identifiers, device identifiers, Internet protocol address, personally identifiable information, or a user identifier of a different online system. For each identifier in the federated list of identifiers, the online system generates metadata information such as a confidence score indicating a degree of certainty that the identifier can be used to accurately identify the user of the online system. The online system aggregates features associated with the identifiers in the federated list of identifiers to generate a comprehensive user profile of the user and uses the comprehensive user profile to better serve the user.

20 Claims, 5 Drawing Sheets

ID Table 400

|  | Online System ID | Browser ID | Device ID | Partner ID | 2$^{nd}$ Online System ID | IP Address |
|---|---|---|---|---|---|---|
| User 1 405 | Sebastian | B_579 | ABC | XYZ | Seabass | Address 1 |
| User 2 410 | -logged out- | B_654 | ZYQ | WDI | jump4joy | Address 2 |
| User 3 415 | Viola | B_852 | EJD | XYZ | -None- | Address 3 |

FIG. 4A

Metadata Table 450

| # | ID | Confidence Score | Normalized Weight | Timestamp | Frequency | Connections |
|---|---|---|---|---|---|---|
| 1 | Sebastian | 100% | 1.0 | time$_1$, time$_2$ | 2 | # 2, 3, 4, 5 |
| 2 | Browser ID B_579 | 50% | 0.2 | time$_1$, time$_2$ | 2 | # 1, 3, 4, 5 |
| 3 | Device ID ABC | 50% | 0.1 | time$_1$, time$_3$ | 2 | # 1, 2, 4, 6 |
| 4 | Partner ID XYZ | 80% | 0.1 | time$_1$ | 1 | # 1, 2, 3 |
| 5 | Seabass | 75% | 0.5 | time$_2$ | 1 | #1, 2 |
| 6 | Address 1 | 20% | 0.1 | time$_3$ | 1 | # 3 |

IDENTIFYING USERS BASED ON FEDERATED USER IDENTIFIERS

BACKGROUND

This disclosure generally relates to online systems, and more specifically to creating a federated list of identifiers associated with a user of an online system.

With the increasing number of available online systems, such as social networking systems, users may be individually registered across a wide number of online systems. Each time the user registers with an online system, the user has a new user profile that may be unique to that particular online system. Users may use each online system for different purposes. For example, a user may primarily utilize a first online system as a social online network and primarily utilize a second online system as a professional online network. Thus, users may choose to provide different information in their user profile on each respective online system.

Online systems often utilize the information provided by a user in the user profile for a variety of purposes. For example, online networks may desire to deliver content items that are tailored for a user based on the user's interests and/or characteristics that are listed in the user's profile. However, given that a user may only choose to provide a portion of his/her characteristics or interests to any one online system, each online system may not have a full understanding of the user. This leads to inefficiencies, especially in the context of content delivery where the lack of a comprehensive profile of the user may lead to the delivery of content that is poorly tailored to the user.

SUMMARY

An online system can collect multiple identifiers (IDs) associated with a given user on the online system across different devices, browsers and external or partner online systems. The external or partner online systems can be in a separate domain from the first online system, and can either be managed or owned by separate independent entities or can be managed, owned, or otherwise controlled by the same entity or related entities (e.g., Instagram and Facebook). The online system can generate a federation of IDs (also referred to as "federated list of IDs") including the collected identifiers. Examples of identifiers include online system IDs of the user, device ID, browser ID, personally identifiable information (e.g. email, name, age, etc.), IP address and other information that may be associated with the user of the online system. As one example, these identifiers can be provided to the online system through a redirect request sent by a partner system.

The online system can have its own identifiers for the user, which can include one or more of the examples provided above. The online system can also receive additional identifiers that can also include one or more of the examples provided above that may be other identifiers for the user for the online system or identifiers from partner or external systems for the user. Of these additional identifiers, a subset of the identifiers may have been previously received by and already stored in a federated list of IDs by the online system, whereas another subset is newly received or not already included in the federated list of IDs. The online system recognizes that a subset of the identifiers was previously received and identifies the federated list of IDs that includes identifiers in that subset of identifiers. Additionally, the online system updates the federated list of IDs to include the newly received identifiers, thereby indicating that these new identifiers are also associated with the user of the online system.

Additionally, each identifier in the federated of IDs collected by the online system has metadata information. Metadata information includes one or more of a confidence score indicating a degree of certainty of using the identifier to identify its corresponding user, a weight indicating a relevant importance of the identifier with respect to other identifiers on the list, connections between the identifier and other identifiers on the list, where the connections can be represented by an ID graph, a timestamp of the identifier, and frequency of events associated with the identifier.

The online system obtains features associated with each identifier in the federated list of IDs. The features can be aggregated to generate a comprehensive profile of a user, which is useful for improved targeted content delivery to a user that may have disparate information scattered throughout different online systems (e.g. different interests listed on Facebook, Instagram, etc.) Thus, the online system generates a more comprehensive profile of the user and can more effectively deliver content to the user based on the comprehensive profile of the user.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Overview of System Environment

Figure 1:
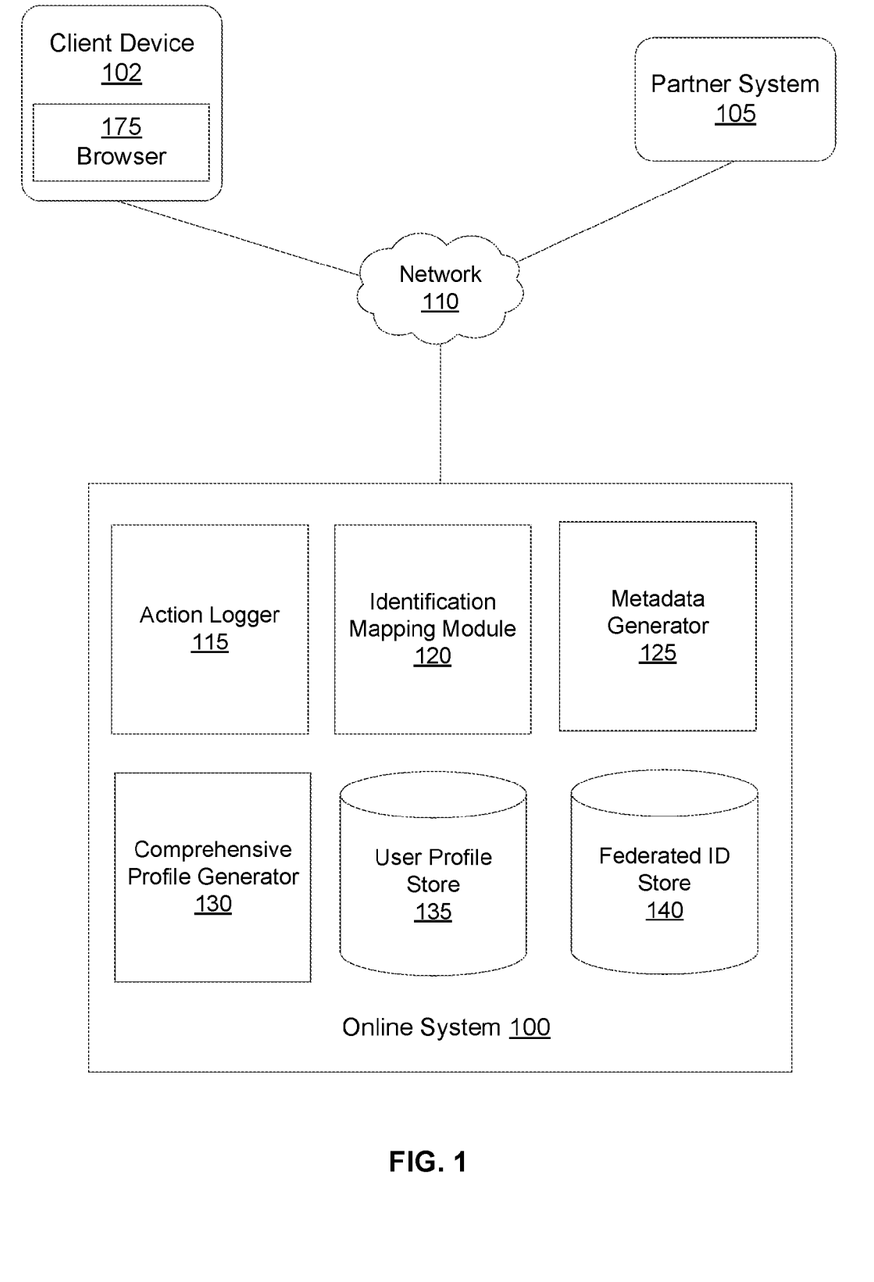
FIG. 1 is a system environment for generating federated IDs of users of an online system, in accordance with an embodiment.

FIG. 1 is a system environment for generating federated IDs of users of an online system 100. In the embodiment shown in FIG. 1, the system environment includes a client device 102 operated by a user of the online system 100, a partner system 105, and the online system 100. The client device 102, the partner system 105, and the online system 100 communicate with one another through a network 110. While FIG. 1 shows one client device 102 for simplicity, each with a browser 175, one online system 100, and one partner system 105, it should be appreciated that any number of these entities may be included in the system environment. In alternative configurations, different and/or additional entities may also be included in the system environment. In one embodiment, the online system 100 is a social networking system. One or more of the partner systems 105 can also be social networking systems.

A client device 102 is a computing device capable of receiving user input through a browser 175, as well as transmitting and/or receiving data via the network 110. Examples of client devices 102 include desktop computers, laptop computers, tablet computers (pads), mobile phones, personal digital assistants (PDAs), gaming devices, or any other electronic device including computing functionality and data communication capabilities. A user of the client device 102 can login to the online system 100 and interact with web pages provided by the online system 100 or the partner system 105. As one example, a user may access a web page of a partner system 105 through the browser 175 of a client device 102 and make a purchase for a product. Additionally, the client device 102 may have a device identifier that uniquely identifies the client device.

The network 110 facilitates communications among one or more client devices 102, the online system 100, and the partner system 105. The network 110 may be any wired or wireless local area network (LAN) and/or wide area network (WAN), such as an intranet, an extranet, or the Internet. In various embodiments, the network 110 uses standard communication technologies and/or protocols. Examples of technologies used by the network 110 include Ethernet, 802.11, 3G, 4G, 802.16, or any other suitable communication technology. The network 110 may use wireless, wired, or a combination of wireless and wired communication technologies. Examples of protocols used by the network 110 include transmission control protocol/Internet protocol (TCP/IP), hypertext transport protocol (HTTP), simple mail transfer protocol (SMTP), file transfer protocol (TCP), or any other suitable communication protocol.

The partner system 105 represents any external system outside of the online system 100. For example, the partner system 105 may be a third party retailer that sells products of interest to users of the online system 100. In other embodiments, the partner system 105 may be a second online system with which the user has previously registered. The partner system 105 can be separate from the online system 100 in that the two do not otherwise share user identifiers. In some embodiments, the two systems are in separate domains and operated independently. In some embodiments, the two systems are completely independent and without any ownership or management connection.

The partner system 105 is responsible for providing data to a user. For example, the partner system 105 provides web page interfaces (e.g. online shopping cart page) for a user to make an online purchase for a product. The user can login using a specific ID belonging to the user on the partner system (e.g. partner system user ID). Additionally, the user may provide personally identifiable information (PII), such as PII that might be provided in a purchase process or during registration as a user of the online system. Both the specific ID identifying the user on the partner system as well as the PII information provided by the user may be stored by the partner system 105 in a database of the partner system 105, as a cookie on the user's browser 175, among other locations.

The online system 100 can receive the IDs of the user to include amongst the federated IDs in various ways and from various partner systems. One or more IDs may be received from partner systems that are third party system not related to or owned by the online system 100. These systems can directly send IDs to the online system 100 or the online system 100 may receive them via other sources, such as via cookies, via tracking pixels on web pages associated with the partner systems 100, or from mobile applications associated with the partner systems 100.

In some embodiments, the online system 100 receives one or more IDs for a user and information about the behavior of the user on various web pages of the partner system 105 using a tracking pixel that the partner system 105 places on the web pages. For example, a user searches for flights to Vienna, Austria on a web page domain hosted by the partner system 105. In one embodiment, the tracking pixel is a segment of HTML code that the online system 100 provides to the partner system 105 to be added to its web pages. For example, a tracking pixel is a transparent 1×1 image, an iframe, or other suitable object. When a user's browser 175 requests the content of a page having the tracking pixel, the HTML code makes a server call to the online system 100, which returns a 1×1 transparent image (e.g., a GIF), and the server call also sends certain information about the user or the actions the user is taking to the online system 100. For example, it may send information about the actions the user was taking on the web page (e.g., putting a product in a shopping cart, completing a checkout process, browsing a product page, etc.), price of product a user looked at or purchased, a SKU number for the product, a color, style, type or size of the product, a timestamp, a user identifier for the user that is used by the partner system 105, among other data. In addition, when the server call is made to the online system 100, the online system 100 can request a cookie that was previously placed on the browser by the online system 100, from which the online system 100 can acquire information about the client device 102 and the browser 175, such as the Internet Protocol (IP) address of the client device 102, an online system user ID for the user, etc. If the browser 175 used to visit the website does not include a cookie previously set by the online system 100, a cookie is then set on the browser 175. If the browser 175 includes a cookie already, the online system 100 can access the cookie.

In one embodiment, the partner system can allow the online system 100 access to a partner system cookie that stores information that the partner system has about a user, browser, device, etc. (this may require user permission for this type of sharing). For example, if the partner system 105 is closely affiliated or owned by the online system 100 (e.g., Instagram and Facebook), the two parties may work together such that the server call to the online system domain results in a redirect of the user's browser to the partner system domain, and under the partner system domain, the partner system cookie can be requested from the browser 175 before the browser is directed back to the online system 100 resulting in the online system 100 having access to the partner system cookie. The partner system cookie may include the partner system's user identifier for the user, a browser ID, a client device ID, and other information the partner system tracks for the user. Thus, the online system 100 gains access to identifiers and behavioral information that are associated with the user from interactions between the user and the partner system 105.

In one embodiment, a user logs into an account on the online system 100 to access a personalized set of web pages, such as a user profile page and a newsfeed page, using a browser 175. When a user logs in to its account with the online system 100, the online system 100 writes one or more cookies to the client device 102, such as to the browser 175, identifying the user and the browser. For example, a cookie including a user identifier associated with the user by online system 100 is stored and a cookie including a browser identifier is stored by the client device 102; the cookie including the browser identifier may include data identifying a browser type. While the user is logged in to the online system 100 using the browser 175, the cookie including the user identifier is stored by the browser 175. The cookie including the browser identifier is stored until it is deleted by the user or deleted by the browser 175. In one embodiment, users may opt out of receiving cookies from the online 100 to prevent the online system 110 from storing cookies using the browser 175.

Where the partner system 105 is owned or managed by the online system 100, the online system 100 may receive the partner system's ID for the user (and other data about the user, such as the partner system's user profile for the user) in other ways. For example, the partner system 105 may provide the ID (or other profile data) directly to the online system 100, or the online system 100 accesses it in a storage associated with the partner system 105 based on the partner system's permission to access the data. User permission can also be requested and/or required for this sharing of data.

The online system 100 maintains user profiles in the user profile store 135, each user profile identified by a user ID and associated with a user of the online system 100. For each user of the online system 100, the user ID can be bundled together into a federated ID list with other identifiers (IDs) that are associated with the user. The other identifiers can be received by the online system 100 from the client device 102 or the partner system 105 (e.g., through the network 110). In various embodiments, the online system 100 includes an action logger 115, an identification mapping module 120, a metadata generator 125, and a comprehensive profile generator 130.

The action logger 115 identifies interactions of users internal and external to the online system 100. User interactions internal to the online system 100 include interactions between users, interactions between a user and a page within the online system 100, interactions between a user and a post on a page. These interactions may be stored as an association (e.g. an edge in a social graph) between the user (e.g. a first node in the social graph) and the entity that the user interacted with (e.g. a second node in the social graph). User interactions with a page outside the online system 100 include purchasing or reviewing a product or service using an online marketplace hosted by a partner system 105, registering with or subscribing to a website hosted by a partner system 105, requesting information from a partner system 105, and other similar actions. These interactions may be previously stored as a cookie on a browser 175 accessed by the user and subsequently provided to the online system 100. When an action is taken on and/or off the online system 100, an entry for the action is generated by the action logger 115 and associated with the user's user profile. Furthermore, a timestamp of each interaction is also logged by the action logger 115.

The identification mapping module 120 creates a new federated list of IDs and/or updates an existing federated list of IDs associated with a user of the online system 100. For example, the identification mapping module 120 receives identifiers (e.g. browser ID, device ID, partner ID, online system ID) and determines whether each identifier is already stored in a federated list or if the identifier is newly received by the online system 100.

Figure 3:
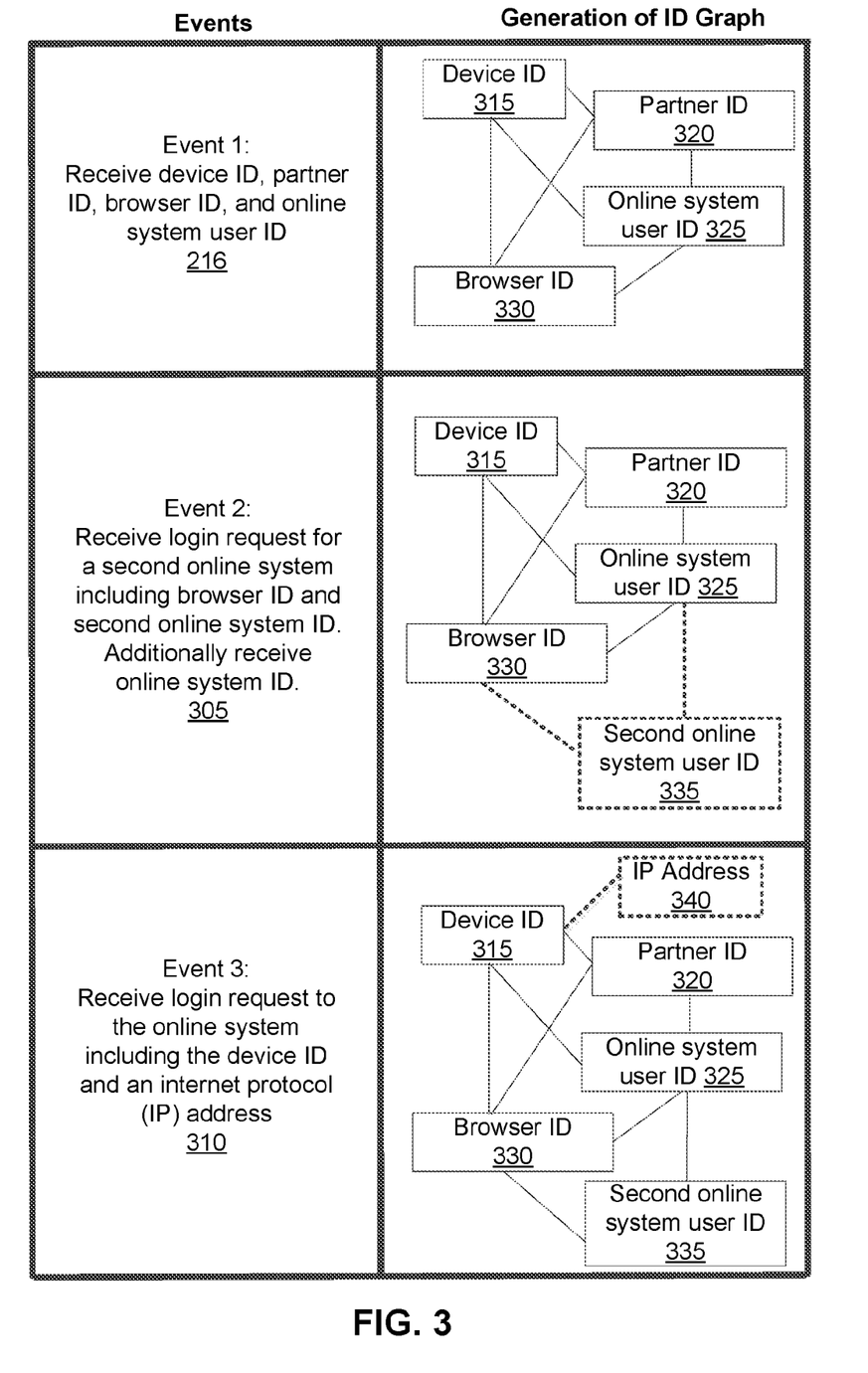
FIG. 3 depicts a process of generating and updating a federated list of identifiers associated with a user of the online system, in accordance with an embodiment.

In one embodiment, if all of the identifiers associated with a user are newly received by the online system 100, the identification mapping module 120 creates a new federated list associated with the user that includes the received identifiers. FIG. 3 shows an example of creation of a new federated list of IDs for a user. The identifiers associated with a user are associated with one another by identifying the corresponding user across multiple devices, browsers and systems. In one embodiment, multiple identifiers associated with a user were all received at the same time, indicating they are all likely associated with a single user. In another embodiment, if at least one of the received identifiers is already stored in a federated list associated with a user, the identifier mapping module 120 adds the newly received identifiers to the existing federated list of IDs and updates the federated list based on the connections of the newly received identifier with the identifiers already on the federated list. FIG. 3 also shows an example of updating the federated list of IDs of a user in response to a newly received identifier. The identification mapping module 120 stores the newly generated or updated federated list of IDs in the federated ID store 140. In one embodiment, the federated list of IDs is stored as key value pairs, where each identifier is referenced by a key (e.g., textual, numeric or combination of thereof), and each key has a corresponding value (e.g., textual, numeric or combination of thereof).

The metadata generator 125 receives the newly created or updated federated list of IDs and generates or updates the metadata information associated with each ID in the federated list of IDs. For example, metadata information of an identifier may include a confidence score, a weight, a timestamp, a frequency, and information specifying the connections between the identifier and other IDs on the list. Specifics of each type of metadata information associated with an identifier is described further in metadata table 450 in FIG. 4B.

As one example, a user may use a new client device 102 for the first time to login to the online system 100. Therefore, the online system 100 receives the device ID associated with the new client device 102 and bundles the device ID with a federated list of IDs that is associated with the user. The metadata generator 125 generates new metadata information for the new device ID. New metadata information of an identifier may include a confidence score that represents a degree of certainty that the new device ID can be used to accurately identify the user associated with the federated list of IDs. If the user continues to access the online system 100 using the same client device 102, the online system 100 continues to receive the same device ID that is stored in the federated list of IDs associated with the user. Thus, the metadata generator 125 can increase the confidence score associated with the device ID, indicating a higher degree of certainty that the device ID can be used to identify the corresponding user. The metadata generator 125 associates the metadata information with the federated list of IDs and stores the metadata information in the federated ID store 140.

The comprehensive profile generator 130 retrieves the federated list of IDs associated with a user of the online system 100 and obtains features associated with each ID in the federated list of ID. For example, the user may have an online system user ID (e.g. Facebook ID) that is associated with a user profile of the user, and the user profile indicates that the user has interests in dogs. The federated list of IDs of the user may also include a second online system ID (e.g. Instagram ID) that is associated with a user profile of the user, and the user profile associated with the second online system ID indicates a different user interest such as cats. For example, the user may continuously post pictures of his/her cat. In some embodiments, the comprehensive profile generator 130 extracts the user's interest in dogs as a feature associated with the online system user ID and extracts the user's interest in cats as a feature associated with the second online system user ID. The comprehensive profile generator 130 creates a comprehensive profile that indicates the user's interest in both dogs and cats. In one embodiment, the generated comprehensive profile of the user is stored in the user profile store 135.

Collection of Identifiers

Figure 2:
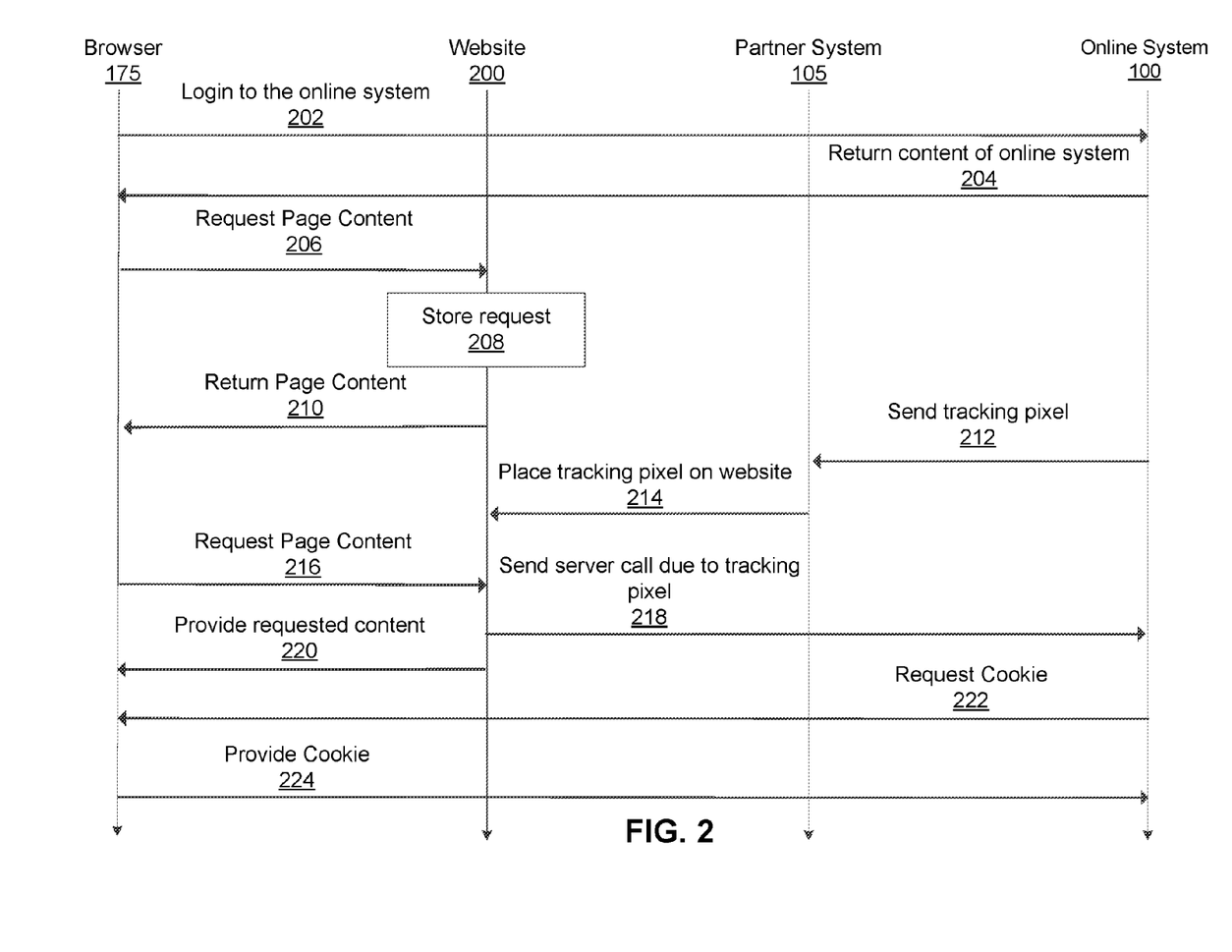
FIG. 2 is an interaction diagram depicting an example for providing identifiers associated with a user to the online system, in accordance with an embodiment.

FIG. 2 depicts an interaction diagram between a browser 175 on a client device 102, a website 200 of the partner system 105, and the online system 100. FIG. 2 illustrates one embodiment of how the online system 100 may receive identifiers (e.g. browser ID, device ID, partner ID) based on the actions of the user external to the online system 100. One skilled in the art can appreciate a variety of different scenarios in which the online system 100 receives one or more identifiers associated with a user of the online system 100.

In various embodiments, a user of the online system 100 may use a browser 175 on a client device 102 to access content on the online system 100. For example, the user logs in 202 to the online system using the browser 175 by providing the appropriate user ID and password. The online system 100 receives the login information and returns 204 the content of the online system 100. In response to such an access to the online system 100, the online system 100 may store a cookie including the user ID (e.g. online system user ID) that was provided by the user to login to the online system 100. The cookie is stored on the browser 175.

In one embodiment, at a subsequent time after logging into the online system 100, the user may use the browser 175 on the client device 102 to access a website 200 of the partner system 105. For example, the user may decide to partake in online shopping on the website 200 associated with the partner system 105 and provides instructions for the browser to request 206 page content for a particular product of interest. The user provides a login to the partner system 105 using a partner system user ID that the user has previously set up with the partner system 105. The website 200 stores 208 the request including the partner system user ID. In various embodiments, the partner system user ID is stored as a cookie on the browser 175 used by the user of the client device 102. The website 200 returns 210 the page content requested by the user. Steps 206, 208, and 210 may occur repeatedly as the user continues to browse different online websites 200.

In various embodiments, the online system 100 sends 212 a tracking pixel to the partner system 105 to better understand the behavior of users that are browsing web pages of the partner user 105. The partner system places 214 the tracking pixel on a website 200. The user of the client device 102 requests 216 page content from the website 200 using the browser 175. The website 200 can provide 220 the requested content to the browser 175 similar to step 210.

Additionally in this scenario, the website 200 includes the tracking pixel from the online system 100. Therefore, when the browser 175 requests 216 content from the website 200, a server call to the online system 100 is sent 218 due to the presence of the tracking pixel. In various embodiments, the website also sends, along with the server call, the browsing information of the user on the website 200 of the partner system 105. The online system 100 requests 222 a cookie from the browser 175 of the client device 102 when the server call is sent. The online system 100 is able to access the cookie provided 224 by the browser 175 and gain access to the identifiers that are stored in the cookie (e.g. online system user ID, partner system user ID, and other identifiers).

In various embodiments, as described above, the partner system 105 is owned or closely affiliated with the online system 100. Therefore, the partner system 105 can provide the information including the partner system user ID, online system user ID, browser ID, and device ID directly to the online system 100.

Example Generation and Updating of Federated List of IDs

FIG. 3 depicts a process of generating and updating a federated list of IDs associated with a user of the online system. As depicted in FIG. 3, events 1, 2 and 3 are presented merely for illustration purposes and do not intend to restrict the sequence of receiving particular identifiers for generating or updating a federated list of ID's.

At event 1, the online system 100 receives a device ID, partner ID, browser ID, and online system user ID associated with a user as illustrated in step 216 in FIG. 2. In various embodiments the received device ID, partner ID, browser ID, and online system user ID are in a cookie that was previously stored in the browser 175 used by the user. The action logger 115 logs the actions of the user associated with the stored cookie. For example, the action logger 115 logs each of the requests (e.g. 206, 208) sent by the browser 175 and the timestamp of each request.

The identification mapping module 120 searches through the federated ID store 140 to determine whether any of the received IDs are stored in a previously generated federated ID list. In one embodiment, the identification mapping module 120 does not locate each of the device ID, partner ID, browser ID, and online system user ID in the federated ID store 140 because each ID is newly received by the online system 100. Therefore, the identification mapping module 120 creates a new federated list of IDs from the received identifiers. In one embodiment, the identification mapping module 120 creates an ID graph connecting the device ID 315, the partner ID 320, the online system user ID 325, and the browser ID 330. Given that the four IDs were received by the online system 100 at generally the same time, each ID is associated with the other three received IDs (e.g. as depicted by lines between each ID).

In a subsequent event 2, the online system 100 may receive identifiers associated with a login request by the user to a second online system such as Instagram. In this scenario, the second online system plays a role similar as the partner system 105 as depicted in FIG. 2. For example, a user may login to the online 100 system (e.g. Facebook) on a browser 175 with a browser ID 330 by providing the online system user ID 325 and the associated password. Thus, the browser ID 330 and online system user ID 325 is stored in a cookie on the browser 175. At a different time, the user may provide a login request including a second online system user ID and a password using the same browser 175 (e.g. same browser ID 330) to a second online system (e.g. Instagram). Thus, a cookie including the second online system user ID and browser ID 330 is stored on the browser 175 in addition to the previously stored cookie with the browser ID 330 and online system user ID 325. As a different embodiment of the process in FIG. 2, the second online system may transmit 214 a redirect to the online system 100. Therefore, the browser 175 provides the stored cookie information including the second online system user ID and the same browser ID. In various embodiments, the user may have previously logged into the online system using the browser 175. Therefore, the stored cookie provided to the online system 100 also includes the online system user ID.

Similar to event 1, the action logger 115 logs the actions of the user. The identification mapping module 120 searches the federated ID store 140 for the received IDs. In this case, the identification mapping module 120 identifies that the browser ID 330 and the online system user ID 335 already exist in a federated list of IDs and are associated with one another. Therefore, given that the second online system user ID is received with the same browser ID 330 and online system user ID 335, the second online system user ID is added to the federated list of IDs associated with the user of the online system 100. The identification mapping module 120 updates the federated list of IDs to include the second online system user ID 335 with associations (e.g. depicted by dotted lines) with the browser ID 330 and the online system user ID 325.

In some embodiments, event 3 occurs and the online system 100 may receive an IP address associated with a device ID. For example, the user may access a partner web page using a client device 102 with a device ID and a corresponding wireless fidelity (WiFi) and Internet protocol (IP) address. The user may have previously used the client device 102 identified by the device ID to login to the online system 100, therefore the device ID currently exists in the federated list of IDs. Similar to event 1 and 2, the action logger 115 logs the user actions and the identification mapping module 120 identifies the device ID 315 as already existing in the federated list of ID's. Therefore, the federated list of IDs is updated with the IP address associated with the device ID.

Example Federated List of IDs

Figure 4A:
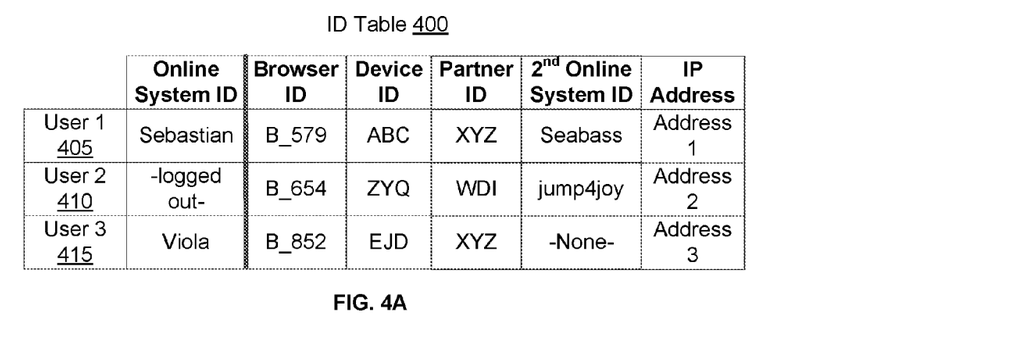
FIG. 4A is an example identifier table depicting federated lists of identifiers, in accordance with one embodiment.

FIG. 4A depicts an example ID table 400 of the stored federated lists of IDs with identifiers, each of which is associated with a user of the online system 100. For example, the online system 100 may have stored three different federated lists of IDs, one for User 1 (405), a second for User 2 (410), and a third for User 3 (415). Each of the users is associated with an online system user ID (e.g. Sebastian, not identified because the user logged out of the online system 100, or Viola) that identifies the user of the online system 100, if available. Additionally, the IDs that are bundled in a federated list of IDs associated with a user are listed in the horizontal row of the table. For example, for User 1 (405), Sebastian is associated with a browser ID (B_579), Device ID (ABC), Partner ID (XYZ), a second online system user ID (Seabass), and IP Address (Address 1). In various embodiments, a federated list of IDs associated with a user may not have an ID for every category shown in the ID Table 400. For example, User 3 (415) has a federated list of IDs for Viola and the online system 100 has not recognized a second online system ID as being associated with Viola. Therefore, it is currently listed as "-None-". However, if in the future the online system 100 receives a new second online system ID associated with any of the other identifiers in Viola's federated list of IDs (e.g. B_852, EJD, MNO, or Address 3), the online system 100 updates the federated list of IDs with the new second online system ID.

Figure 4B:
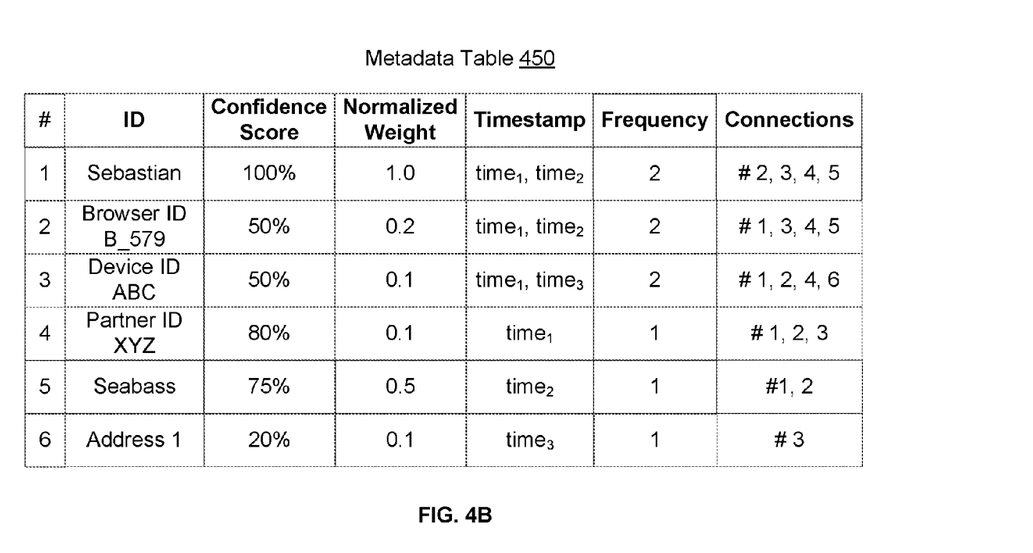
FIG. 4B is an example metadata table associated with one user of the online system, in accordance with an embodiment.

FIG. 4B depicts an example metadata table 450 for a federated list of IDs associated with a user. For example, FIG. 4B shows a metadata table 450 generated by the metadata generator 125 for a user identified by his/her online system user ID (e.g., Sebastian) which is listed in row #1. The other IDs that are in the federated list of IDs associated with Sebastian are listed in rows #2-6. In various embodiments, the metadata generator 125 generates the metadata information for each ID immediately after the federated list of IDs is newly generated or updated. In various embodiments, the metadata information generated for each ID includes a confidence score, a weight, a timestamp, a frequency, and ID connections.

The confidence score of an ID associated with a user reflects a degree of certainty that the ID can be used to accurately identify the corresponding user of the online system 100. The confidence score increases as the degree of certainty increases. For example, the online system user ID (Sebastian) has a confidence score of 100% because it unambiguously identifies Sebastian as a user of the online system 100. In various embodiments, there may be a default confidence score for each ID based on the ID type. For example, a browser ID may be initially assigned a relatively low confidence score of 25% because a user may use other types of browsers. Alternatively, the second online system ID (Seabass) is assigned a significantly higher default confidence score of 75% because each user of the second online system, e.g., Instagram, is required to have a unique identifier on the second online system. However, these confidence scores are adjustable over time. For example, the confidence score for a browser ID can be increased if the online system 100 continues to receive the same browser ID associated with the same online system user ID. For example, the second time that browser ID (B_579) is received along with the online system user ID (Sebastian), the confidence score of the browser ID (B_579) may increase to 50%, indicating a higher degree of certainty that the browser ID (B_579) is truly associated with Sebastian.

In some embodiments, the confidence score of a new ID is determined based on the confidence score of other IDs associated with a user that the online system 100 receives. For example, a federated list of IDs may include an online system ID (Sebastian, 100% confidence score) and a device ID (ABC, 50% confidence score). If the online system 100 receives a second online system user ID (Seabass) along with the online system user ID (Sebastian, 100% confidence score), the metadata generator 125 assigns a higher confidence score to the second online system user ID as opposed to if the online system 100 receives the second online system user ID (Seabass) along with the device ID (ABC, 50% confidence score).

In various embodiments, a confidence score for an ID in a federated list of IDs of a user can be decreased. For example, a federated list of IDs may include an online system user ID (Sebastian) and a second online system user ID (Seabass) with their respective confidence scores. However, if the online system 100 receives the second online system user ID (Seabass) along with a different online system user ID (e.g. Viola), then the online system 100 may decrease the confidence score associated with the second online system user ID (Seabass) to account for the contradictory information. The decrease in confidence score reflects a decrease in the degree of certainty that the second online system user ID (Seabass) can be used to accurately identify Sebastian on the online system 100. In some embodiments, the online system 100 can remove an ID from the federated list of IDs when the confidence score of that ID decreases below a certain threshold. Thus, this helps correct for IDs that may be received with other IDs, but do not actually belong to the user of the online system 100.

The weight of an ID indicates the relevant importance of the ID for the user with respect to other IDs on the federated list of IDs associated with the user. The online system 100 may calculate the weight of each ID normalized to the weight of the online system user ID. For example, as depicted in metadata table 450, the weight of the online system user ID (Sebastian) is 1.0, the weight of the second online system ID (Seabass) is 0.5, and so on.

The weight of each ID may be assigned based on the type of ID. For example, the weight of the second online system user ID (Seabass) is higher than those for other types of IDs because the second online system may contain important features that describe the user. As one example, the second online system may be Instagram, and the user may provide interests or information that would reveal characteristics of the user. Alternatively, the Device ID (ABC) or the IP Address (Address 1) would reveal less important features regarding the user and are therefore weighted lower (e.g. 0.1). The weights may be taken into consideration in future use cases of the federated list of IDs. For example, when the online system 100 wants to target content items to the user based on features of the user that have originated from different IDs, the online system 100 can consider the weights associated with each ID to determine the importance of each feature.

The timestamp of an ID indicates when the ID was received by the online system 100. For example, referring to event 1 in FIG. 3, the device ID, partner ID, online system user ID, and browser ID were all received when event 1 occurred at $time_1$. Therefore, the timestamp associated with those four identifiers is stored as $time_1$. If the ID is received again in the future, as is the case for browser ID (B_579), the subsequent time (e.g. $time_2$) is recorded in the metadata table.

In various embodiments, the timestamps associated with an identifier can affect the metadata generated, namely the confidence score, for newly received identifiers. As one specific example, the metadata table 450 may have stored a federated list of IDs that includes an ID identifying a user of the online system (Sebastian) and two different device IDs (e.g. ABC1 and ABC2). The metadata table 450 may include received timestamps for a first device ID that are predominantly between the hours of 8 am and 6 pm during the work week (Monday-Friday). Additionally, the metadata table 450 may include received timestamps for a second device ID that are predominantly between the hours of 6 pm and midnight during the work week and during the weekends. Thus, it is likely that a user is using a first device associated with a first device ID at work and a second device associated with a second device ID elsewhere. For example, if the online system 100 receives a new identifier along with the first device ID that falls within the predominantly received timeframe (e.g. between 8 am and 6 pm, Monday-Friday) of that first device ID, the new identifier is included in the federated list of IDs and associated with a high confidence score. Alternatively, if the online system 100 receives the new identifier with the first device ID that falls outside of the timeframe, the new identifier is included in the federated list of IDs but associated with a lower confidence score.

In various embodiments, the frequency of events associated with each ID is also stored in the metadata table 450. For example, given that browser ID (B_579) was received by the online system 100 at $time_1$ for a first event and $time_2$ for a second event, the stored frequency is 2. As stated previously, the frequency of events associated with an ID directly impacts the confidence score of the ID. A higher frequency of events associated with browser ID (B_579) correlates to a higher confidence score of the browser ID to reflect the stronger association between the browser ID (B_579) and the online system user ID (Sebastian) in terms of events engaged by Sebastian via browser B_579.

The connections of an ID indicate any associations that exist between the ID and the other IDs in the federated list of IDs. For example, the online system user ID (Sebastian) is associated with the browser ID (B_579), device ID (ABC), partner ID (XYZ) and the second online system user ID (Seabass). As depicted in FIG. 4B, the ID connections metadata references the row of the metadata table that stores metadata of an associated ID. For example, the ID connections metadata for Sebastian references rows 2, 3, 4, and 5 for the browser ID, device ID, partner ID, and second online system user ID, respectively. Although the metadata table 450 employs a referential column to identify IDs that are associated with a particular ID, one skilled in the art can envision alternative methods. For example, ID connections may be stored as a key-value pair, where the key identifies a connection and the value specifies a value associated to the corresponding connection.

As an example, the metadata table 450 is a depiction of the generated metadata information following event 3 of the method of FIG. 3. At event 1, the online system user ID 325 (Sebastian), the browser ID 330 (B_579), the device ID 315 (ABC), and the partner ID 320 (XYZ) are all received by the online system 100 at $time_1$. Therefore, the timestamp records the timing. The metadata generator 125 generates the confidence score, normalized weight, and connections for each of those IDs.

At event 2, the second online system user ID 335 (Seabass) is received with the browser ID 330 (B_579) and the online system user ID 325 (Sebastian). The metadata generator 125 records the timestamp metadata with $time_2$ for these three IDs. Additionally, the confidence score of the browser ID 330 (B_579) is increased because it is the second time that the browser ID has been associated with the online system user ID. The frequency of events associated with the browser ID (B_579) is updated to 2 to reflect this second event. Additionally, the confidence score, normalized weight, and connections for the second online system user ID 335 (Seabass) are generated.

At event 3, the IP address 340 (Address 1) is received along with the device ID 315 (ABC). The online system 100 records the timestamp of $time_3$ for the two IDs and updates the metadata information associated with device ID 315 (ABC) because it is the second time receiving the device ID. Additionally, the metadata generator 125 generates the confidence score, normalized weight, and connections for the IP address 340 (Address 1).

Process of Generating and Updating a Federated List of IDs

Figure 5:
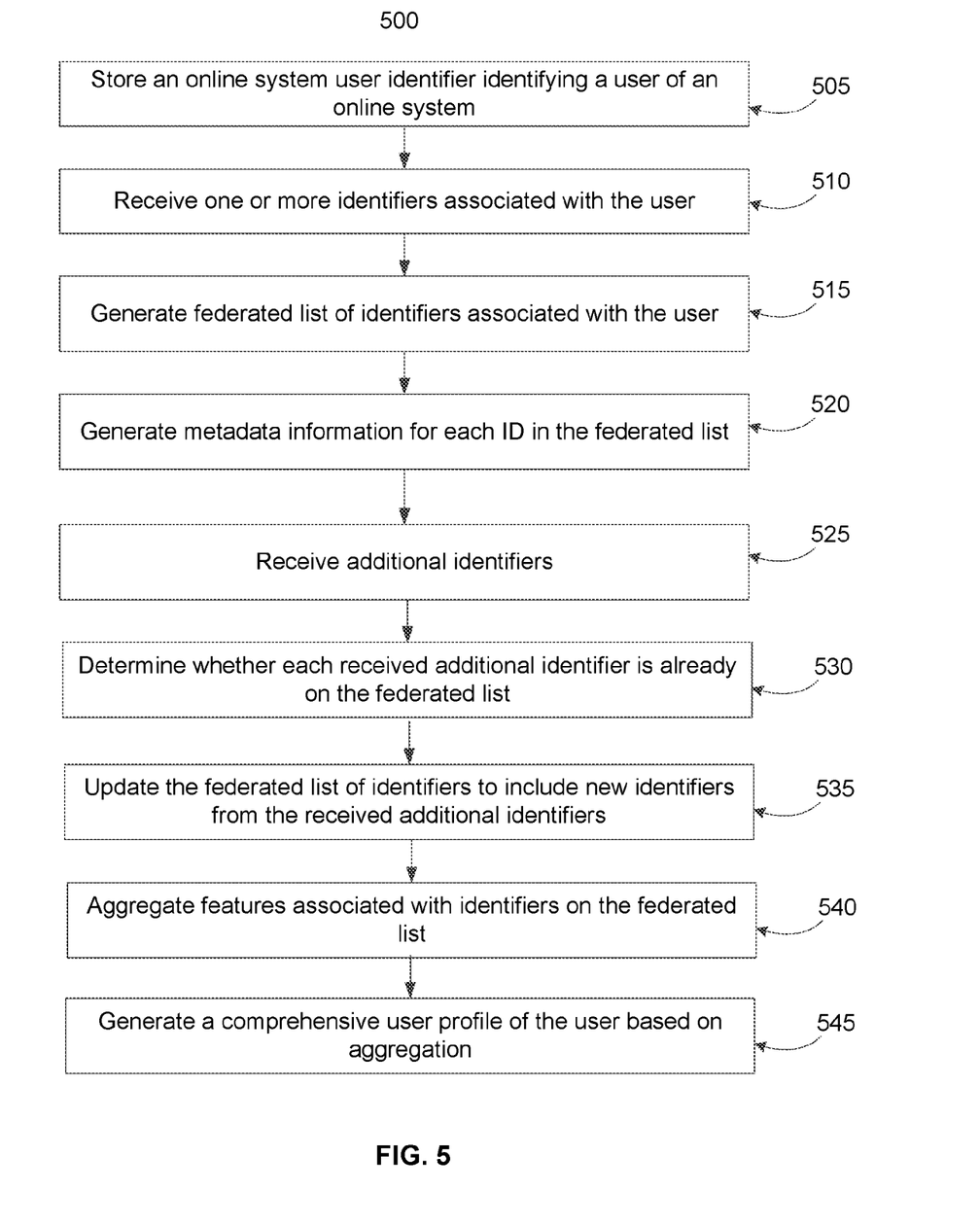
FIG. 5 illustrates a flowchart of generating and updating a federated list of identifiers and corresponding metadata associated with a user of the online system, in accordance with one embodiment.

FIG. 5 illustrates a flow process 500 of generating and updating a federated list of IDs for a user of the online system 100, in accordance with one embodiment. The online system 100 stores 505 an online system user ID that identifies a user of the online system. The online system 100 receives 510 one or more identifiers along with the online system user ID. The online system 100 searches the federated ID store 140 to determine whether the any of the received identifiers are already stored in a federated list of IDs associated with the user. If not, the online system 100 generates 515 a new federated list of IDs which includes the one or more received identifiers and the online system user ID. For each of the identifiers in the federated list of IDs, the online system 100 generates 520 metadata information (e.g. confidence score, weight, timestamp, frequency).

In response to receiving 525 additional identifiers, the online system 100 determines 530 whether each received additional identifier is currently in the federated list of IDs for the user. The online system 100 updates 535 the federated list of identifiers to include any new identifiers in the received additional identifiers that have not previously been stored in any federated list of IDs. In some embodiments, the online system 100 also generates the metadata associated with the new identifiers in the federated list of IDs. The online system 100 extracts features associated with each identifier in the federated list of identifiers associated with the user, where each feature describes a characteristic of the user. The online system 100 aggregates 540 the extracted features to generate 545 a comprehensive user profile of the user. The comprehensive user profile more comprehensively represents the user than a user profile of the user associated with an individual online system. The online system 100 can provide the user better online services based on the comprehensive user profile, e.g., provide targeted sponsored content to the user that are determined based on the features of the user in the comprehensive user profile.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, by an online system, a plurality of identifiers associated with a user of the online system, the identifiers including at least a device identifier, a first user account identifier for the online system, and a second user account identifier for a partner system different from the online system;
   determining that each identifier in the received plurality of identifiers has not been previously received by the online system;
   generating a federated list of identifiers associated with the user comprising the plurality of identifiers;
   for each identifier in the federated list of identifiers, generating metadata information associated with the identifier, the metadata information indicating a likelihood that the identifier can be used to identify the user from a set of users of the partner system;
   storing the federated list of identifiers and the generated metadata information for each identifier in the federated list of identifiers;
   in response to receiving an additional identifier associated with the user and in response to the federated list of identifiers not already including the additional identifier, updating the federated list of identifiers associated with the user to include the additional identifier; and
   aggregating features describing the user from user accounts associated with the identifiers in the federated list of identifiers that are associated with an above-threshold likelihood that the identifier can be used to identify the user to generate a comprehensive user profile that includes features from the device associated with the device identifier, the online system, and the partner system.

2. The method of claim 1, wherein each identifier in the federated list of identifiers associated with the user is one of an online system user identifier, a browser identifier, a cookie identifier, a device identifier, a partner identifier, personally identifiable information identifying the user, a user identifier of a different online system that identifies the user, and an Internet protocol address.

3. The method of claim 1, wherein generating metadata information associated with each identifier further comprises generating a confidence score, a weight, a timestamp, identifier connections, and a frequency of events.

4. The method of claim 3, wherein the confidence score of an identifier indicates a degree of certainty that the identifier can be used to accurately identify the user of the online system.

5. The method of claim 4, wherein the confidence score of the identifier is determined based on the frequency of events associated with the identifier, wherein a higher frequency of events correlates to a higher confidence score of the identifier.

6. The method of claim 3, wherein the weight of an identifier represents importance of the identifier relative to other identifiers in the federated list of identifiers.

7. The method of claim 1, wherein the federated list of identifiers is represented by an identifier graph that includes connections between pairs of identifiers in the federated list of identifiers, and wherein each identifier in the federated list of identifiers is stored by the online system as a key-value pair.

8. The method of claim 7, wherein the identifier graph includes at least one connection between an online system user identifier that identifies the user of the online system and the at least one identifier received from the partner system.

9. The method of claim 1, wherein aggregating features associated with the identifiers in the federated list of identifiers comprises:
for each identifier in the federated list of identifiers, extracting features associated with the identifier from a user profile of the online system and from a user profile of the partner system, each extracted feature representing a characteristic of the user; and
aggregating the extracted features to generate the comprehensive profile of the user.

10. The method of claim 1 further comprising:
generating the comprehensive user profile for the user of the online system comprising the aggregated features describing the user; and
storing, by the online system, the generated comprehensive user profile.

11. The method of claim 10 further comprising:
selecting a content item to be presented to the user of the online system based on the aggregated features describing the user included in the generated comprehensive user profile; and
providing the content item for viewing by the user of the online system.

12. A non-transitory computer-readable medium comprising computer program instructions, the computer program instructions when executed by a processor of a computer device causes the processor to perform the steps including:
receiving, by an online system, a plurality of identifiers associated with a user of the online system, the identifiers including at least a device identifier, a first user account identifier for the online system, and a second user account identifier for a partner system different from the online system;
determining that each identifier in the received plurality of identifiers has not been previously received by the online system;
generating a federated list of identifiers associated with the user comprising the plurality of identifiers;
for each identifier in the federated list of identifiers, generating metadata information associated with the identifier, the metadata information indicating a likelihood that the identifier can be used to identify the user from a set of users of the partner system;
storing the federated list of identifiers and the generated metadata information for each identifier in the federated list of identifiers;
in response to receiving an additional identifier associated with the user and in response to the federated list of identifiers not already including the additional identifier, updating the federated list of identifiers associated with the user to include the additional identifier; and
aggregating features describing the user from user accounts associated with the identifiers in the federated list of identifiers that are associated with an above-threshold likelihood that the identifier can be used to identify the user to generate a comprehensive user profile that includes features from the device associated with the device identifier, the online system, and the partner system.

13. The non-transitory computer-readable storage medium of claim 12, wherein each identifier in the federated list of identifiers associated with the user is one of an online system user identifier, a browser identifier, a cookie identifier, a device identifier, a partner identifier, personally identifiable information identifying the user, a user identifier of a different online system that identifies the user, and an Internet protocol address.

14. The non-transitory computer-readable storage medium of claim 12, wherein generating metadata information associated with each identifier further comprises generating a confidence score, a weight, a timestamp, identifier connections, and a frequency of events.

15. The non-transitory computer-readable storage medium of claim 14, wherein the confidence score of an identifier indicates a degree of certainty that the identifier can be used to accurately identify the user of the online system.

16. The non-transitory computer-readable storage medium of claim 15, wherein the confidence score of the identifier is determined based on the frequency of events associated with the identifier, wherein a higher frequency of events correlates to a higher confidence score of the identifier.

17. The non-transitory computer-readable storage medium of claim 12, wherein the federated list of identifiers is represented by an identifier graph that includes connections between pairs of identifiers in the federated list of identifiers, and wherein each identifier in the federated list of identifiers is stored by the online system as a key-value pair.

18. The method of claim 17, wherein the identifier graph includes at least one connection between an online system user identifier that identifies the user of the online system and the at least one identifier received from the partner system.

19. The non-transitory computer-readable storage medium of claim 12, wherein aggregating features associated with the identifiers in the federated list of identifiers comprises:
for each identifier in the federated list of identifiers, extracting features associated with the identifier from a user profile of the online system and from a user profile of the partner system, each extracted feature representing a characteristic of the user; and
aggregating the extracted features to generate the comprehensive profile of the user.

20. The non-transitory computer-readable storage medium of claim 12, further comprising computer instructions that, when executed by a processor of a computer device, causes the processor to perform the steps including:
generating the comprehensive user profile for the user of the online system comprising the aggregated features describing the user;
selecting a content item to be presented to the user of the online system based on the aggregated features describing the user included in the generated comprehensive user profile; and
providing the content item for viewing by the user of the online system.

* * * * *

UNITED STATES PATENT AND TRADEMARK OFFICE
CERTIFICATE OF CORRECTION

PATENT NO. : 10,412,076 B2  
APPLICATION NO. : 15/282666  
DATED : September 10, 2019  
INVENTOR(S) : Mehul S. Parikh et al.

Page 1 of 1

It is certified that error appears in the above-identified patent and that said Letters Patent is hereby corrected as shown below:

In the Claims

In Column 16, Claim 18, Line 35, delete "The method of claim 17," and insert -- The non-transitory computer-readable storage medium of claim 17, --, therefor.

Signed and Sealed this  
Seventeenth Day of March, 2020

Andrei Iancu  
*Director of the United States Patent and Trademark Office*